Patented May 6, 1930

1,757,394

UNITED STATES PATENT OFFICE

WERNER SCHULEMANN, OF VOHWINKEL, AND WALTER KROPP, OF ELBERFELD, GERMANY, ASSIGNORS TO WINTHROP CHEMICAL COMPANY, INC., OF NEW YORK, N. Y.

AMINOALKYLAMINO DERIVATIVE OF AROMATIC AMINOHYDROXY OR POLYAMINO COMPOUNDS

No Drawing. Application filed June 30, 1927, Serial No. 202,741, and in Germany July 8, 1926.

The present invention relates to new aminoalkylamino derivatives of aromatic aminohydroxy- or polyamino compounds and more particularly to the compounds of the general formula:

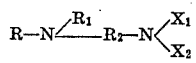

in which R designates an aromatic radicle of the group including the benzene and naphthalene series substituted by at least one amino-, alkylamino-, hydroxy- or alkoxy-group, $R_1$ stands for hydrogen, alkyl, alkylamino, alkylaminoalkyl or dialkylaminoalkyl, $R_2$ stands for an alkylene group, the carbon atom chain of which may be interrupted by oxygen, sulphur or nitrogen, or for the residue of an isocyclic or heterocyclic compound, $X_1$ and $X_2$ stand for alkyl groups one of which may be substituted by hydrogen, or for the carbon chain of a heterocyclic compound, in which case the outermost N will be part of the ring.

These compounds can be obtained, for instance, by heating aromatic amino-hydroxy- or polyamino-compounds of the benzene or naphthalene series with a halogen-alkyl-amino-dialkyl compound. In this process it is generally advantageous to add an acid-binding agent and to use a diluent or a solvent.

Our new compounds are likewise obtainable by causing aromatic amino-hydroxy- or polyamino-compounds of the benzene or naphthalene series to be acted upon by ethylene oxide or a halogenized alcohol and by converting the hydroxyalkylamino derivatives thus obtained into the dialkylaminoalkyl compounds according to the usual methods. We do not specifically mention here all processes suitable for preparing our compounds, some other processes being described in the examples.

The following examples serve to illustrate our invention without limiting it thereto, all parts being by weight.

*Example 1.*—A solution of 109 parts 1-amino-3-hydroxy-benzene in 200 ccm. benzene are mixed with a solution of 140 parts diethylaminoethyl-chloride in 200 ccm. benzene and heated several hours on the boiling water bath while stirring. After cooling, the benzene is decanted and the viscous residue is dissolved in water. The reaction product is salted out by means of potash and extracted by ether. The ethereal solution is dried, the ether distilled off. The residue is purified by distillation under a vacuum of 1.5 mm. pressure. At a temperature of 171° C. the 3-hydroxy-1-diethylamino-ethyl-amino-benzene distills over as a viscous oil. It has the formula:

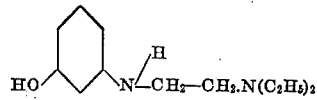

By treatment with ether-hydrochloric acid its hygroscopical chlorine hydrate is obtained, which is easily soluble in water.

If, as starting material, 3-hydroxy-1-N-monoethyl-amino-benzene is used and the process is carried out in the same way as described above, the 3-hydroxy-1-N-(ethyl-)-diethyl-amino-ethylamino-benzene of the formula:

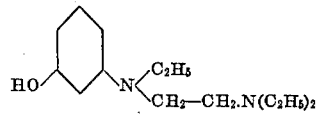

is obtained, which boils under a pressure of 2 mm. at a temperature of 175° C., and has a melting point of 50° C. It possesses similar properties of the compound described above.

*Example 2.*—110 parts of resorcine and 130 parts of asymetrical methyl-diethylethylenediamine of the formula:

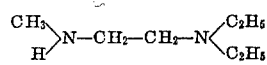

are heated for several hours on the oil bath to a temperature of about 200° C. The reaction mass is extracted with diluted hydrochloric acid whereby the unchanged resorcine remains undissolved. Then the hydrochloric acid solution is made alkaline and the unchanged diamino-compounds are extracted by ether. By acidifying again the alkaline solution, adding carbonate of potash and extracting by ether, the 1-hydroxy-3-N-(methyl)-diethyl-amino-ethylaminobenzene is obtained which has, under a pressure of 0.5 mm., a boiling point of 151° C., and has the formula:

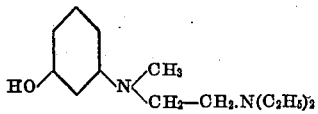

*Example 3.*—16 parts 3.4-diethoxy-1-aminobenzene, 14 parts diethylamino-ethylchloride and 0.5 parts water are heated 2 hours to 80–90° C. Then water and soda lye are added and the whole is extracted with chloroform. The chloroform solution is dried with sodium sulfate, the chloroform evaporated and the residue purified by distillation in a vacuum. The reaction product distils over under a pressure of 2 mm. at a temperature of 185–186° C. It has the formula:

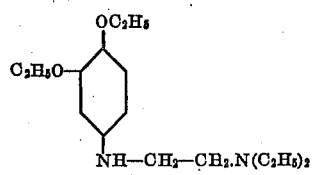

and possesses excellent properties against blood parasites.

*Example 4.*—25 parts 1-diethylamino ethylamino-3.4-diethoxy-benzene, described in Example 3, are heated together with 50 parts diethylamino-ethylchloride 5–6 hours to 130–140° C. The reaction mass is diluted with water and soda lye and extracted with ether. The ethereal solution is dried, the ether evaporated and the residue purified by distillation under a vacuum. At first some unchanged starting material distils over, then at a temperature of 203–204° C., under a pressure of 1.5 mm. the reaction product distils over. It has the formula:

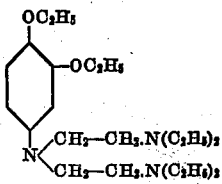

and possesses excellent properties against blood parasites.

*Example 5.*—21 parts 2.6-di-isopropyloxy-1-amino-benzene having the melting point 63° C., and at a pressure of 3 mm. the boiling point 123° C. are heated to boiling under a reflux condenser together with 28 parts diethylamino-ethylchloride and 30 parts water for 10 hours. The reaction mixture is worked up as in the other examples. Under a pressure of 2.5 mm. the new compound distils over at a temperature of 188–190° C., forming a colorless oil of the following formula:

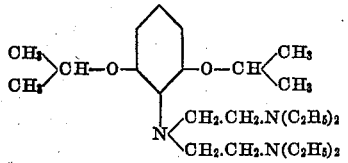

It forms a solid chlorine hydrate which is easily soluble in water and it has a strong action against blood parasites.

*Example 6.*—7.2 parts 4.5-dimethoxy-1.2-diaminobenzene, 14 parts diethylamino-ethylchloride and 12 parts water are heated for several hours on the water bath. After addition of water and soda lye the solution is extracted with chloroform. The chloroform solution is then dried, the chloroform evaporated and the residue purified by distillation. The reaction product distils over under a pressure of 2 mm. at a temperature of 203° C. It has the formula:

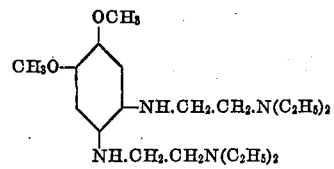

*Example 7.*—A solution of 100 parts 3-nitro-1-aminobenzene in 500 ccm. benzene is mixed with a solution of 98 parts diethylamino-ethylchloride in 100 ccm. benzene and heated for several hours on the water bath. After cooling, the hydrochloric acid salt separates; it is filtered off, dissolved in water and reduced by means of iron and acetic acid. Then the solution is freed from iron, evaporated to a small volume, and after addition of potash, extracted with ether and worked up as usual. The 1-amino-3-N-diethyl-amino-ethylamino-benzene thus obtained boils under a pressure of 1 mm. at a temperature of 158–159° C. It has the formula:

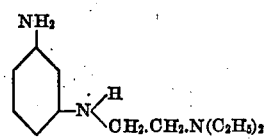

*Example 8.*—The N-(methyl)-diethylamino-ethylaminobenzene obtained by introducing one-diethylamino-ethyl group into monomethylaminobenzene is converted into the p-nitroso compound by treatment with sodium nitrite and hydrochloric acid while cooling well. The p-nitroso compound is then reduced by introducing zinc dust. A layer of ether is laid over the aqueous solution and while cooling concentrated soda lye is added until the zinc hydroxide is completely dissolved. By working up as in the other examples the 4-amino-N-(methyl)-diethylamino-ethylaminobenzene is obtained which boils under a pressure of 3 mm. at a temperature of 161–163° C., having the formula:

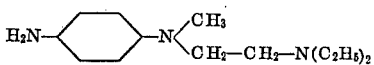

*Example 9.*—The compounds described in Examples 7 and 8 can be used for the production of further alkylated compounds possessing a high efficiency against blood parasites. For instance, by heating 1 mol of the 4-amino-N-(methyl)-diethylamino-ethylaminobenzene described in Example 8 with 1 mol of diethylamino-ethylchloride on the oil bath for 16 hours to a temperature of about 110° C. and distilling the reaction mixture, the compound of the following formula is obtained:

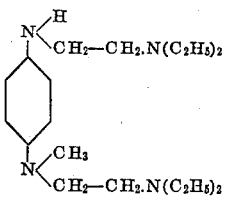

which boils under a pressure of 1 mm. at a temperature of 186° C.

*Example 10.*—15 parts of the zinc salt of the 1-amino-4-dimethylamino-2-thiophenol are dissolved in 175 parts of warm soda lye of 8% strength. The solution is filtered, 8 parts methyliodide are added at a temperature of about 40–45° C. After the reaction is finished, the solution is extracted with ether. The residue which remains when evaporating the ether, is purified by distillation. The 1-amino-4-dimethylamino-2-methylthiophenol is obtained which boils under a pressure of 3 mm. at a temperature of 135° C., forming an oily liquid.

6 parts of this compound are heated together with 13.5 parts (about 3 mol) diethylamino-ethylchloride and 6 parts benzene to a temperature of about 120–130° C. After working up in the usual manner the 1-di-(diethylaminoethylamino)-4-dimethylamino-2-methylthiophenol is obtained which boils under a pressure of 2 mm. at a temperature of 198–204° C. and forms a yellow oil. It has the formula:

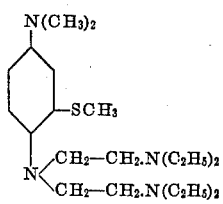

When treated with dry hydrochloric acid in ethereal solution, it forms a white chlorine hydrate which is easily soluble in water.

*Example 11.*—18 parts 3-methoxy-4-isopropyloxy-1-aminobenzene are heated together with 28 parts of the dichlorine hydrate of the (ethyl-)-di(ethyl-)amino(ethyl-)-aminoethylchloride for 8 hours to 100–110° C. By working up in the usual manner the compound of the following formula is obtained:

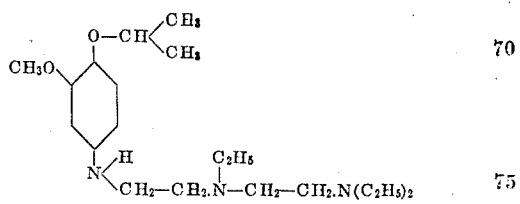

which boils under a pressure of 2 mm. at a temperature of 189–191° C., forming a colorless oil and a solid chlorine hydrate, easily soluble in water.

In analogous manner are obtained, for instance, the following compounds:

3-methoxy-4-isopropyloxy-1-N-(α-piperidly-β-hydroxy γ-propyl)-aminobenzene, prepared by heating 3-methoxy-4-isopropyloxy-1-aminobenzene (m. p. 68–69° C.), with epichlorhydrine and piperidine, boiling under a pressure of 5 mm. at a temperature of 225–230° and melting at 92–94° C., 3-methoxy-4-isopropyloxy-1-N-(β'-ethyl-β-diethylamino-ethylsulfide)-aminobenzene, prepared by treating 3-methoxy-4-isopropyloxy-1-aminobenzene with (C$_2$H$_5$)$_2$.N.CH$_2$.CH$_2$.S.CH$_2$.CH$_2$.Cl (hydro chloride), is a viscous oil, boiling under a pressure of 5 mm. at a temperature of 225–227° C.

3-methoxy-4-isopropyloxy-1-N-(β'-ethyl-β-diethylamino-ethylether)-aminobenzene boiling under a pressure of 1.5 mm. at a temperature of 186–188° C., is obtained by heating 3-methoxy-4-isopropyloxy-1-aminobenzene with the hydrochloride of (C$_2$H$_5$)$_2$.N.CH$_2$.CH$_2$.O.CH$_2$.CH$_2$.Cl (boiling point 72–73° C. under 5 mm.).

3-methoxy-4-isopropyloxy-1-N-(α-dimethylamino-γ-ethoxy-β-propyl)-aminobenzene, boiling under a pressure of 1 mm. at a temperature of 166–168° C., obtained by treating 3-methoxy-4-isopropyloxy-1-aminobenzene with the hydrochloride of (CH$_3$)$_2$N.CH$_2$.CH(Cl).CH$_2$.O.C$_2$H$_5$.

(boiling point 69–70° C. under 15 mm. pressure).

3-methoxy-4-isopropyloxy-1-N-(1'-dimethylamino-2'-cyclohexyl-)aminobenzene, boiling under a pressure of 2 mm. at a temperature of 173–175° C., formed by heating of 3-methoxy-4-isopropyloxy-1-aminobenzene with 1-chloro-2-dimethylamino-cyclohexane (boiling point 77–79° C. under 10 mm. pressure).

*Example 12.*—The sodium salt of 2.3-dihydroxynaphthalene-1-azobenzene sulfonic acid are methylated with dimethyl sulfate in the usual manner and converted by reduction with stannous chloride into the 2.3 dimethoxy-1-amino-naphthalene which distils under a pressure of 2 mm. at a temperature of 167° C.

2 parts of this compound are heated together with 8 parts benzene and 3 parts diethylamino-ethylchloride for 8 hours to a temperature of about 90° C. After cooling, the hydrochloride salt separates, is filtered by suction and decomposed with soda lye. The free base thus obtained distils under a pressure of 2 mm. at a temperature of 207° C., forming a colorless oil which is easily soluble in hydrochloric acid. It has the formula:

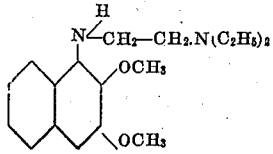

When this base is treated once more with diethylamino-ethylchloride, the compound of the following formula is obtained:

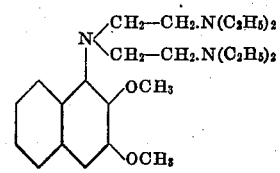

which boils under a pressure of 2 mm. at 240° C.

*Example 13.*—The dry potassium salt of 1-methoxy-2-hydroxy-5-nitrobenzene is suspended in xylene and is caused to be acted upon by the equivalent amount of diethylamino-ethylchloride at a temperature of 135° C., whereby the 1-methoxy-2-diethylaminoethoxy-5-nitrobenzene is obtained which boils under a pressure of 2 mm. at a temperature of 187–190° C. By reduction by means of iron and acetic acid, the 1-methoxy-2-diethylamino-ethoxy-5-aminobenzene is obtained which boils under a pressure of 2 mm. at a temperature of 178–180° C. It has the formula:

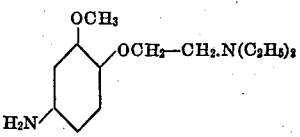

This amine is dissolved in xylene and treated at a temperature of 120° C., with the molecular amount of diethylamino-ethylchloride. The separating salt is dissolved in water and decomposed by means of soda lye. The compound thus obtained has the formula:

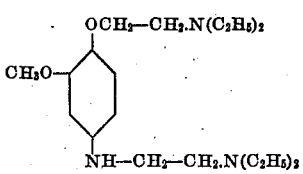

It boils under a pressure of 2 mm. at a temperature of 218–222° C.

We claim:

1. As new products the aromatic compounds of the general formula:

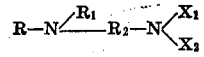

in which R designates an aromatic radicle of the group including the benzene and naphthalene series substituted by at least one amino-, alkylamino-, hydroxy- or alkoxy-group, $R_1$ stands for hydrogen, alkyl, alkylamino, alkylaminoalkyl or dialkylaminoalkyl, $R_2$ stands for an alkylene group, the carbon atom chain of which may be interrupted by oxygen, sulphur or nitrogen, or for the residue of an isocyclic or heterocyclic compound, $X_1$ and $X_2$ stand for alkyl groups one of which may be substituted by hydrogen, or for the carbon chain of a heterocyclic compound in which case the outermost N will be part of the ring, which compounds are generally viscous oils of a high boiling point and possess valuable pharmaceutical properties, especially a high efficiency against blood parasites.

2. As new products the aromatic compounds of the general formula:

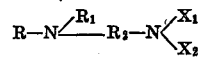

in which R designates an aromatic radicle of the group including the benzene and naphthalene series substituted by at least one amino-, alkylamino-, hydroxy- or alkoxy-group, $R_1$ stands for hydrogen, alkyl, alkylamino, alkylaminoalkyl or di-alkylaminoalkyl, $R_2$ stands for an alkylene group the carbon atom chain of which may be interrupted by oxygen, sulphur or nitrogen, $X_1$ and $X_2$ stand for alkyl groups one of which may be substituted by hydrogen, which compounds are generally viscous oils of a high boiling point, possessing valuable pharmaceutical properties, especially a high efficiency against blood parasites.

3. As new products the aromatic compounds of the general formula:

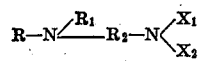

in which R designates an aromatic radicle of the group including the benzene and naphthalene series substituted by at least one amino-, alkylamino-, hydroxy- or alkoxy-group, $R_1$ stands for hydrogen which may be substituted by a substituent of the group comprising alkylaminoalkyl and di-alkylaminoalkyl, $R_2$ stands for an alkylene group, $X_1$ and $X_2$ stand for alkyl groups one of which may be substituted by hydrogen, which compounds are generally viscous oils of a high boiling point and possess valuable pharmaceutical properties, especially a high efficiency against blood parasites.

4. As new products the aromatic compounds of the general formula:

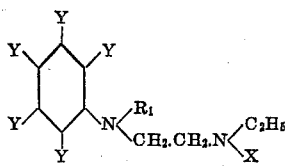

wherein $R_1$ stands for hydrogen, an alkyl-, or dialkylaminoalkyl group, X stands for alkyl or dialkylaminoalkyl and Y stands for hydrogen, at least one hydrogen atom being substituted by an amino-, alkylamino-hydroxy- or alkoxy-group, which compounds are generally viscous oils of a high boiling point and possessing valuable pharmaceutical properties, especially a high efficiency against blood parasites.

5. As new products the compounds of the following formula:

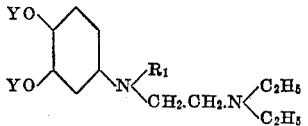

wherein $R_1$ stands for hydrogen, an alkyl-, or dialkylaminoalkyl group, and Y stands for hydrogen or an alkyl-group containing less than 4 carbon atoms, which are generally viscous oils of a high boiling point and possessing valuable pharmaceutical properties, especially a high efficiency against blood parasites.

6. As new products the compounds of the formula:

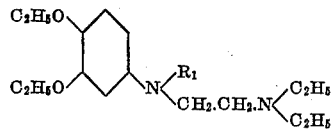

wherein $R_1$ stands for hydrogen or the group

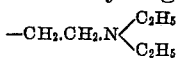

which are generally viscous oils of a high boiling point and possess valuable pharmaceutical properties, especially a high efficiency against blood parasites.

7. As a new product the compound of the formula:

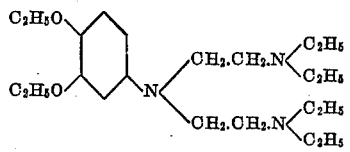

which is a viscous oil boiling under a pressure of 1,5 mm. at a temperature of 203–204° C. and possesses valuable pharmaceutical properties, especially a high efficiency against blood parasites.

In testimony whereof we have hereunto set our hands.

WERNER SCHULEMANN.
WALTER KROPP.